G. A. ROBERTSHAW.
ECCENTRIC ADJUSTMENT FOR THERMOSTATS.
APPLICATION FILED APR. 14, 1920.
1,376,462.
Patented May 3, 1921.
2 SHEETS—SHEET 1.
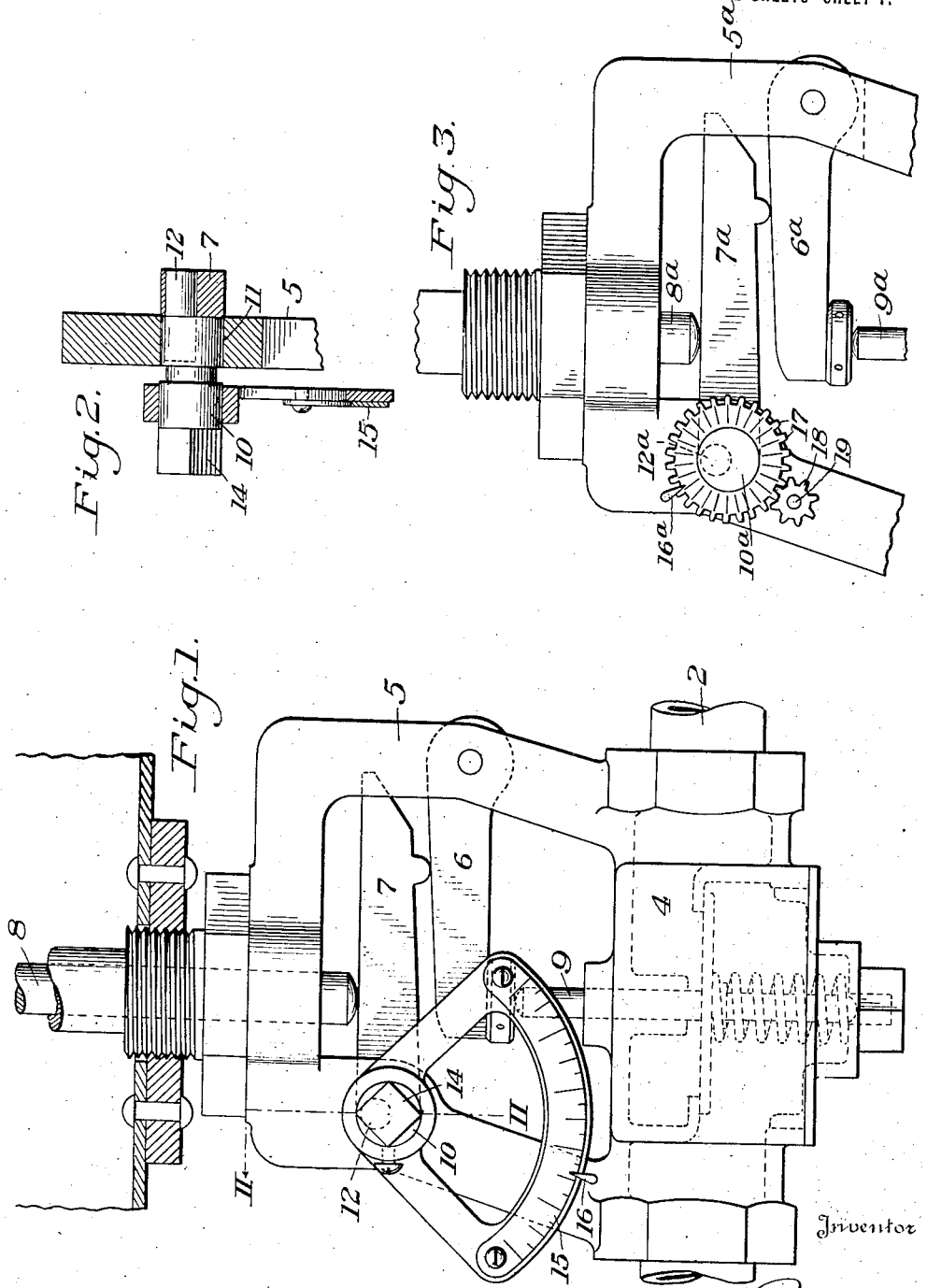
Inventor
George A. Robertshaw,
By Bakewell, Byrnes, Parmelee
Attorneys G. A. ROBERTSHAW.
ECCENTRIC ADJUSTMENT FOR THERMOSTATS.
APPLICATION FILED APR. 14, 1920.
1,376,462.
Patented May 3, 1921.
2 SHEETS—SHEET 2.
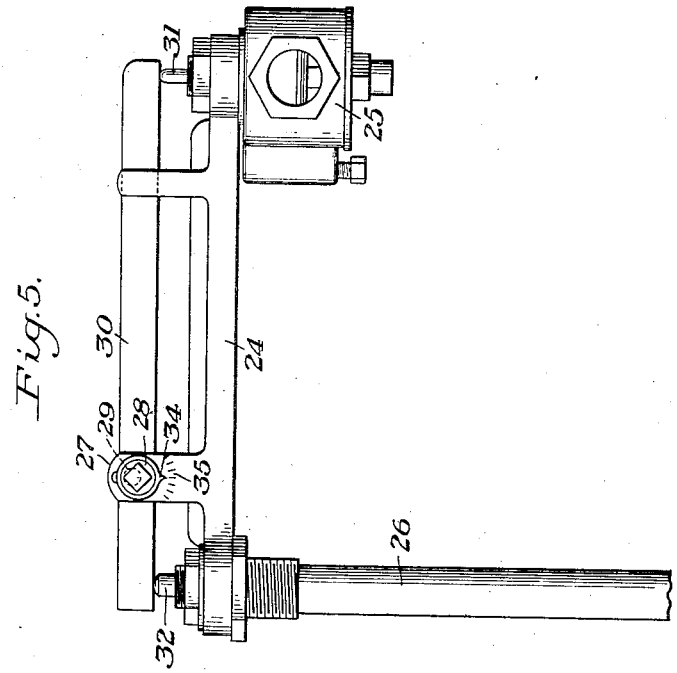
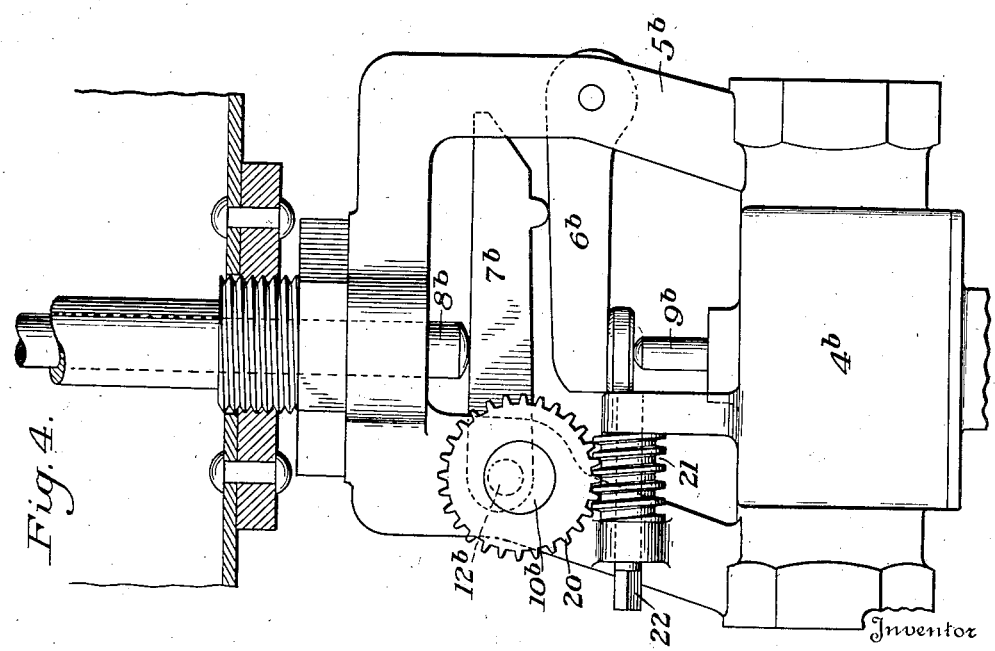
Inventor
George A. Robertshaw,
By Bakewell, Byrnes & Parmelee
Attorneys

UNITED STATES PATENT OFFICE.

GEORGE A. ROBERTSHAW, OF GREENSBURG, PENNSYLVANIA.

ECCENTRIC ADJUSTMENT FOR THERMOSTATS.

1,376,462.   Specification of Letters Patent.   Patented May 3, 1921.

Application filed April 14, 1920. Serial No. 373,980.

*To all whom it may concern:*

Be it known that I, GEORGE A. ROBERTSHAW, a citizen of the United States, residing at Greensburg, Westmoreland county, Pennsylvania, have invented a new and useful Improvement in Eccentric Adjustments for Thermostats, of which the following is a full, clear, and exact description, reference being had to the accompanying drawings, forming part of this specification.

The present invention relates broadly to thermostats, and more particularly to an adjustment whereby the temperature effective for opening the valve controlled by the thermostat may be regulated.

The principal object of the present invention is to provide a fine adjustment for thermostats enabling the manufacturer to determine the maximum and minimum temperature settings possible.

A further object of the invention is to provide an adjusting device for thermostats whereby a customer is not able to make such a setting that upon cooling the valve will be damaged.

A still further object of the present invention is to provide an adjustment for thermostats of the type described in which the lost motion usually present in ordinary screw adjustments is eliminated.

Another object of the present invention is to provide an adjustment comprising an eccentric provided with a suitable dial by reason of which it is impossible to lose the original setting or point of adjustment.

Still another object of the present invention is to provide an adjustment enabling the valve setting to be changed from a distant point.

The foregoing and other objects, together with their attendant advantages, will be apparent as the invention becomes better understood, by reference to the accompanying specification and drawings forming a part thereof, it being premised that changes may be made in the various details and the manner of operation, within the scope of the appended claims, without departing from the sprit of the invention.

Figure 1 is a side elevation partly in section of a portion of a thermostat and the valve controlled thereby with my improved adjustment intermediate the two.

Fig. 2 is a partial sectional view on the line II—II of Fig. 1.

Fig. 3 is a side elevation of a modified form of adjustment.

Fig. 4 is a view corresponding to Fig. 1 of a further modification, and

Fig. 5 is a side view of a different arrangement of thermostat and valve employing my improved adjustment.

Where thermostats are utilized for controlling valves, it is desirable to effect a definite and accurate adjustment of the thermostat enabling it to be set for operation at certain predetermined temperatures. It is also desirable that these temperatures may be determined either before the valve is installed, or after the same is installed, and that means be provided for changing the setting.

Heretofore it has been customary to regulate thermostats by ordinary screw adjustments, which adjustments have been found in practice to permit a considerable amount of lost motion, thereby rendering the thermostat inaccurate to this extent. In addition, the ordinary screw temperature adjustment, unless equipped with a stop, can be turned more than one revolution. As it is difficult to furnish a satisfactory dial for use after the screw has completed one complete revolution, it will be apparent that the original setting is easily lost. By means of the eccentric adjustment as shown herein, it is impossible to lose the original recording point of adjustment, as no matter how many times the eccentric shaft is revolved, each complete revolution will restore the parts to their original condition.

A further disadvantage inherent in thermostats having the ordinary screw adjustment is the possibility of turning the screw so far that when the valve cools, the levers will strike the body of the same and damage the valve. By properly regulating the amount of eccentricity, the manufacturer can limit the maximum temperature at which the valve can be used, thereby preventing damage to the valve by providing at all times sufficient room in the yoke to take up the movement of the levers from the closed position of the valve to the full open position thereof.

Referring more particularly to the drawings, there is illustrated in Fig. 1 a pipe line 2 having any desired type of valve 4 therein, and provided with a yoke 5 adapted to carry the levers 6 and 7 and the expansible element 8 of the thermostat. In constructions of this nature, the levers 6 and 7 are customarily positioned intermediate the expansible element 8 and the valve stem 9 for transmitting movement from the thermostat to the valve for opening the same.

It will be apparent that with a construction of this type, the temperature at which the thermostat will be effective for opening the valve may be controlled by moving the lever 7 in such a manner that it is either moved closer to the expansible element or away from the same. For accomplishing this movement there is provided an eccentric, illustrated in detail in Fig. 2, comprising a main body 10 having a bearing 11 in the yoke 5 and provided with an eccentric pin or projection 12 extending through the lever 7. At its forward end, the main body may be squared, as indicated at 14, enabling a wrench or other adjustable device to be applied thereto for changing the position of the pin or projection 12 and thereby adjusting the lever 7. To enable the amount of adjustment to be accurately determined, the body member 10 may have secured thereto a dial 15 of any desired construction and provided with calibrations coöperating with an index finger or pointer 16.

With the construction described it is possible to accurately adjust the position of the lever 7 and thereby vary between minimum and maximum points the temperatures at which the thermostat is effective for opening the valve. At the same time it is impossible to lose the original setting as the parts will be restored to their original positions automatically upon each complete revolution of the body member 10.

In Fig. 3 there is illustrated a slightly modified means for adjusting the position of the eccentric. As the general construction of the parts corresponds to that already described, they are indicated by the same reference characters with the letter $a$ affixed thereto. In the form shown in this figure, the body member or shaft $10^a$ is provided with a pinion 17 having calibrations thereon coöperating with the index finger or pointer $16^a$. For operating the pinion 17 there may be provided a pinion 18 meshing therewith and carried by a shaft 19 which may be extended to any desired point and equipped with means for rotating the same. In some instances it is desirable to have the pinion 18 much smaller than the pinion 17 in order to furnish the necessary power for adjusting the thermostat. In other instances, however, the gear ratio may be approximately the same as will be readily apparent.

The construction shown more particularly in Fig. 4 corresponds generally to the devices already described, and the corresponding parts therein are indicated by the same reference characters with the letter $b$ affixed thereto. In this construction the shaft $10^b$ is provided with a worm wheel 20 adapted to be rotated by means of a worm 21 carried on the shaft 22 journaled in the yoke $5^b$. The shaft 22 may be elongated so as to be extended to a distant point, permitting adjustment of the valve where it would otherwise be inaccessible. With this construction also, a complete rotation of the worm wheel 20 will restore the parts to their original setting, thereby preventing its original setting from becoming lost.

In Fig. 5 the modified type of valve is illustrated as comprising a suitable base or bracket 24, supporting at one end a valve 25 of any desired construction, and at its opposite end a thermostat 26. The bracket 24 may be provided with bearings 27 upstanding therefrom and adapted to receive the shaft 28 corresponding to the main body 10 before described. This shaft also carries an eccentric 29 extending through the lever 30 coöperating with the valve stem 31 and the expansible element 32 of the thermostat. One end of the shaft 28 may be squared, as illustrated, and provided with a pointer 34 coöperating with graduations 35 on the bearing 27. By rotating the shaft 28 the position of the lever 30 may be changed to vary the temperature at which the thermostat is effective for opening the valve.

It will be obvious that the various constructions described and illustrated may, to a large extent, be interchanged and that other changes or modifications may be made within the scope of the claims.

The advantages of the present invention arise from a construction permitting accurate adjustment of the thermostat without the possibility of damaging any of the parts.

Further advantages of the invention reside in the elimination of the lost motion usually found in screw adjustments and in mechanism which prevents losing the original setting.

Still other advantages have been pointed out in the body of the specification.

I claim:

1. A device of the class described, comprising a valve, a thermostat, a pivoted lever intermediate said valve and thermostat, and means for changing the position of the pivotal axis of said lever, said means being adapted upon continued operation in the same direction to restore the lever to its original position, substantially as described.

2. An adjustment for thermostats comprising a support, a lever pivoted therein, and rotatable means for changing the position of the pivotal axis of said lever, said means returning the pivotal axis to its original position upon a complete revolution thereof, substantially as described.

3. An adjustment for thermostats comprising a support, a lever pivoted therein, and an eccentric for changing the position of the pivotal axis of said lever, substantially as described.

4. An adjustment for thermostats comprising a support, a lever, an eccentric coöperating with said lever, and means for adjusting said eccentric, substantially as described.

5. An adjustment for thermostats comprising a support, a lever, a shaft journaled in said support, an eccentric carried by said shaft and coöperating with said lever, and means for adjusting said shaft, substantially as described.

6. An adjustment for thermostats comprising a support, a lever, a shaft journaled in said support, an eccentric carried by said shaft and coöperating with said lever, means for adjusting said shaft, and a dial for determining the amount of adjustment thereof, substantially as described.

7. A device of the class described, comprising a valve, a valve stem, a thermostat having an expansible element, a lever intermediate said valve stem and expansible element, and means for changing the position of said lever, said means being adapted upon continued operation in the same direction to restore the lever to its original position, substantially as described.

8. A device of the class described, comprising a valve, a valve stem, a thermostat having an expansible element, a lever intermediate said valve stem and expansible element, means for changing the position of said lever, said means being adapted upon continued operation in the same direction to restore the lever to its original position, and means for indicating the position of said lever, substantially as described.

9. An adjustment for thermostats comprising a support, means carried thereby for coöperation with a thermostat and a valve, and means for adjusting said first named means, said last named means being effective for restoring said first named means to its original position after the same has been moved a predetermined amount in the same direction, substantially as described.

10. A device of the class described, comprising a valve, a thermostat, a pivotal lever intermediate said valve and thermostat, means for changing the position of the pivotal axis of said lever, and a gear for operating said means, substantially as described.

In testimony whereof I have hereunto set my hand.

GEORGE A. ROBERTSHAW.